United States Patent Office 3,044,174
Patented July 17, 1962

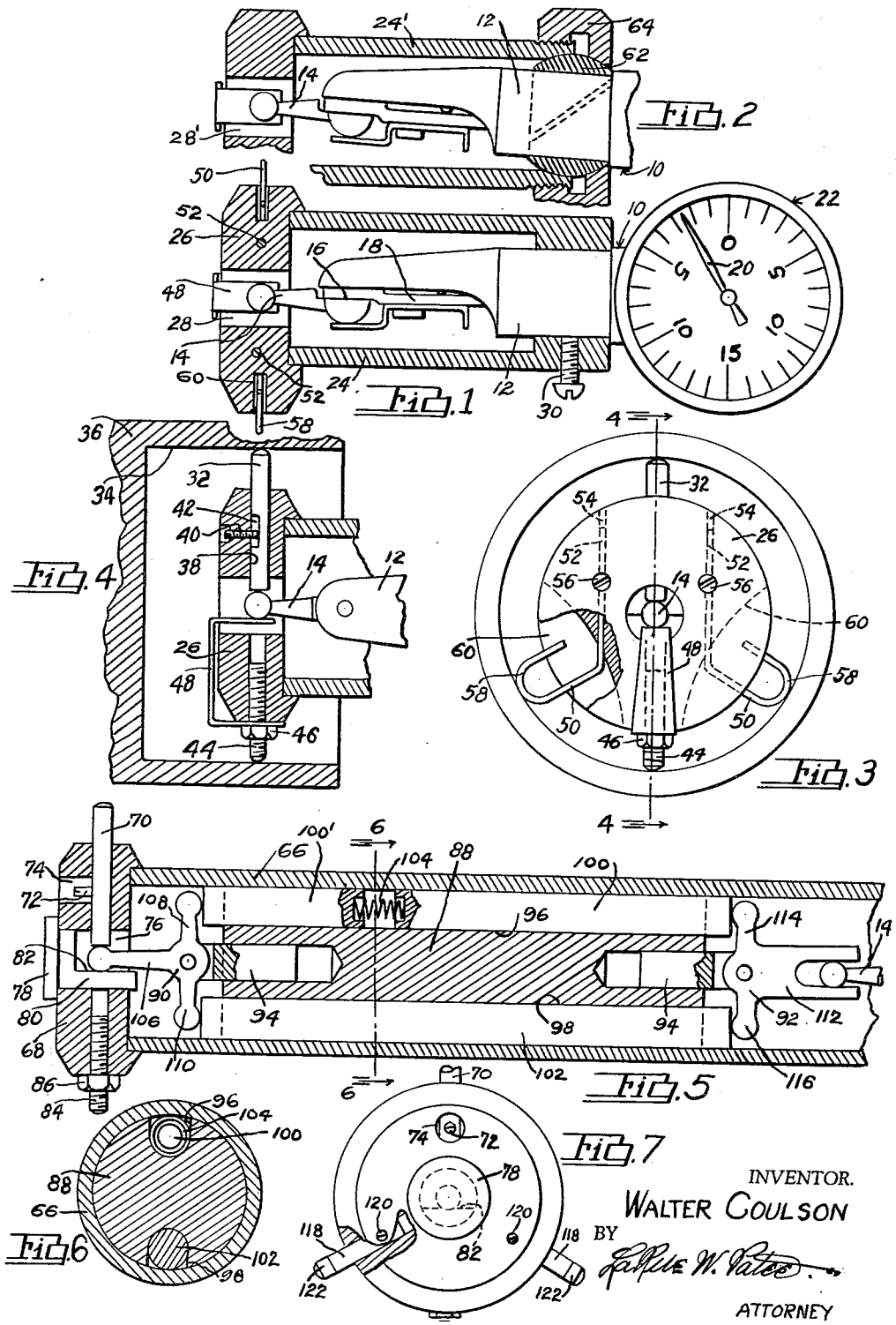

3,044,174
ADAPTER FOR DIAL INDICATOR GAUGE
Walter Coulson, Detroit, Mich.
(336 8th Ave. NE., St. Petersburg 1, Fla.)
Filed Dec. 23, 1957, Ser. No. 704,569
4 Claims. (Cl. 33—178)

This invention relates to an adapter for use with dial indicators whereby a standard dial indicator may be used for checking bore diameters or other parts with extreme accuracy.

It is an object of the present invention to provide an inexpensive device which may be readily attached to a standard dial indicator, commonly found in practically all machine and tool shops where precision is required, for accurately measuring diameters, particularly of bores of considerable depth.

Another object of the invention is to provide the adapter with a head portion which supports a radially movable member which co-operates with the movable indicator on the dial gauge or co-operates therewith through an extension provided in the adapter where bores of considerable depth are measured.

Other objects and advantages of the invention will more fully appear from the following description taken in connection with the accompanying drawings, in which:

FIG. 1 is a longitudinal cross-sectional view of the adapter applied to a dial indicator, shown in side elevation;

FIG. 2 is a view corresponding to FIG. 1 but showing a modified form of attachment of the adapter to the dial indicator;

FIG. 3 is an end view of FIG. 1 with the adapter shown in a bore to be measured;

FIG. 4 is a cross-sectional view taken on line 4—4 of FIG. 3;

FIG. 5 is a longitudinal cross-sectional view of a modified form of the adapter for use in measuring deep bore diameters;

FIG. 6 is a cross-sectional view taken on line 6—6 of FIG. 5; and

FIG. 7 is an end view of FIG. 5.

Referring to the drawings, I have shown a standard conventional dial indicator 10 commonly known throughout the trade as a "last word" indicator wherein a pivoted movement transmitting arm is operated by movement at right angles to the axis of the shank or body portion of the dial indicator, as distinguished from the plunger type or axially movable transmitting plunger. The dial indicator has a shank or body portion 12 supporting a contact arm 14 pivoted to the body portion 12 at 16. Secured to the arm 14 and pivoted therewith is an actuation arm 18 which causes movement of the needle 20 carried by the dial 22, thus indicating the amount of movement of the contact arm 14. This instrument forms no part of the present invention other than in its combination with the adapter. The indicator thus far described may be purchased in the open market and can be found in practically every tool or machine shop where precision is required.

The adapter to be attached to the dial indicator includes a sleeve 24 open at one end and partially closed at its opposite end by a head 26. An opening 28 is provided in the head 26 for receiving the contact arm 14. The sleeve 24 is slid over the body portion 12 of the dial indicator 10 and secured thereto by a setscrew 30.

A radially mounted sizing pin 32 is slidably carried in the head 26 of the adapter to project into the opening 28 in contact with the outer end of the contact arm 14 and projects outwardly beyond the outer surface of the head 26 for contact with the inner periphery of the bore 34 in the work piece 36 being measured. The sizing pin 32 is held loosely in a radial opening 38 by a setscrew 40 threaded in the head 26 and projecting into a slot 42 in the sizing pin 32. This is to retain the pin 32 within the head 26 for limited sliding movement therein. By retracting the screw 40, the sizing pin 32 may be replaced by a longer or shorter pin depending upon the size of the bore 34 to be measured.

Diametrically opposite the pin 32 is an adjustable sizing pin 44 screw threaded into the head 26 which is fixed in its adjusted position by a lock nut 46. This lock nut 46 also secures a flat spring 48 which urges the outer end of the contact arm 14 into contact with the inner end of sizing pin 32 urging the latter outwardly.

In order to accurately position the sizing pins 32 and 44 on the true diameter of the bore being measured, I have provided adjustable centralizing guides 50 at the opposite sides of the sizing pin 44. These guides are shown as spring wire having straight sections 52 received in apertures 54 in the head 26 and adjustably held in a predetermined position by screws 56. The outer ends of the spring wire are formed in loops 58 for contact with the inner surface of the part to be measured. The looped portions 58 are received in slots 60 to prevent twisting.

It will be noted that dial indicators of the type herein illustrated have the indicator arm 14 offset from the axis of the body portion 12 when viewed in side elevation, FIG. 1, but on the axis when viewed from the top, FIG. 4. By rotating the sleeve 24 and head 26 relative to the body portion 12 the radial position of the outer end of the arm 14 may be varied relative to the axis of the opening 28, thereby aiding in the initial setting of the distance between the outer ends of the sizing pins 32 and 44. In this form of the invention the sleeve 24 is eccentric to the axis of the opening 28 in the head 26.

A modified form of the invention is illustrated in FIG. 2 wherein the opening 28' is in axial alignment with the axis of the sleeve 24' and the axis of the body portion 12 is at an angle to the axis of the opening 28'. A split sleeve 62 having a spherical outer surface is slid over the body portion 12. The open end of the sleeve 24' has its inner surface spherically curved to abut one side of the spherical surface on the sleeve 62 and the external surface of the open end is threaded to receive a nut 64 which has a spherical inner surface for abutting the opposite side of the spherical surface on the sleeve 62.

The form of the adapter above described is suitable for measuring short bores, but where the bore is of considerable depth it is desirable to provide an extended adapter for use with the same dial indicator as used in the shorter adapter. Such an extended adapter is shown in FIGS. 5, 6 and 7, illustrating a modification of the device.

A sleeve 66 is secured to a head 68. This sleeve may be of any desired length having its open end for receiving the dial indicator formed as illustrated in FIG. 1 or 2. The head 68 carries a slidably mounted sizing pin 70, loosely held therein by a screw 72 threaded into the pin and has limited radial movement in an opening 74 formed in the head 68. An opening 76 is provided in the head 68 which opening is closed at its outer end by a rubber or resilient plug 78 having an extended portion 80 received in the opening 76 which extended portion is cut away, as at 82, to provide a flat surface. An adjustable sizing pin 84 in axial alignment with the pin 70 is threaded into the head 68 and locked in a predetermined position by a lock nut 86. A rod 88 having a length less than the length of the sleeve 66 is received in the sleeve 66 and carries at its opposite ends toggle levers 90 and 92 pivotally mounted on supporting rods 94 screw threaded or press fitted into the ends of the rod 88. Slidably mounted in diametrically opposite grooves 96 and 98 in rod 88 are thrust rods 100 and 102, the rod 100 being in two pieces 100 and 100' with a compression spring 104 between the adjacent ends of the two piece rod, 100 and 100'. The toggle lever 90 has three arms, 106, 108 and 110. The one arm 106 projects forwardly from its pivot into the opening 76 between the flat surface 82 and the sizing pin 70 and the other two arms 108 and 110 extend in opposite directions at right angles to the arm 106 for contact with the ends of the rods 100' and 102. The other toggle lever 92 has three arms 112, 114 and 116. The arm 112 is bifurcated and receives the end of the contact arm 14 of the dial indicator 10 and the other two arms 114 and 116 extend in opposite directions at right angles to the arm 112 for contact with the opposite ends of the rods 100 and 102. By this arrangement of parts any movement of the sizing pin 70 will be translated through the toggle lever 90 and rods 100 and 102 to the toggle lever 92 and it will cause a corresponding movement to the contact arm 14.

The centralizing guides in this form of the invention are shown as radially mounted pins 118 in the head 68 adjustably held in position by set screws 120. The contact ends of the pins 118 are provided with rubber tips 122.

The adapter forms an inexpensive device to be attached to a standard dial gauge without additional cost of building a complete unit including a dial indicator since dial indicators as a unit are so common in machine and tool shops.

The invention has been illustrated and described in its preferred form, but it will be understood that various changes, including the size, shape and arrangement of parts, may be made without departing from the spirit of the invention and it is not my intention to limit its scope other than by the general terms of the appended claims.

I claim:
1. An adapter for a dial indicator wherein the dial indicator is provided with a shank portion supporting a movement transmitting arm which moves at right angles to the axis of the shank portion on the dial indicator comprising, a head portion having an axial opening therein for receiving a portion of the transmitting arm, a sleeve having its axis parallel to the axial opening in said head portion for securing said head portion to said shank portion of said dial indicator, said shank portion being adjustable with respect to the axis of said sleeve, whereby the axis of the shank portion may be moved relative to the axis of said sleeve, diametrically opposed sizing pins carried by said head and projecting at right angles to the axis of the opening in said head portion and beyond the outer surface of said head portion, one of said sizing pins being slidable with respect to said head portion and arranged for imparting movement to said transmitting arm of the dial indicator, the other of said sizing pins being longitudinally adjustable with respect to said head portion.

2. An adapter for a dial indicator of the pivoted movement transmitting arm type comprising, a sleeve, a head portion at one end of said sleeve, a rod having a length less than the length of said sleeve mounted within said sleeve, diametrically opposite rods slidably carried by said first named rod and projecting beyond the opposite ends thereof, toggle levers pivoted to the opposite ends of said first named rod, said toggle levers each having oppositely disposed arms in contact with the ends of said diametrically opposite rods, one of said toggle levers having an arm projecting into an opening in said head portion and the other of said toggle levers having a bifurcated arm extending along the axis of said first named rod, and oppositely disposed sizing pins carried by said head portion, one of said sizing pins having contact with the toggle lever arm projecting into the opening in said head portion.

3. An adapter for a dial indicator comprising, a movement transmitting member carried by the dial indicator, a head portion having an opening therethrough, for receiving said movement transmitting member, a sleeve secured to said head portion surrounding the opening at one side of said head portion, and supporting the dial indicator, sizing pins radially movable in said head portion with respect to the opening, one of said pins projecting into the opening and outwardly beyond the outer surface of said head portion, a resilient plug in the opening having a cutaway surface in contact with said movement transmitting member spaced from the outwardly projecting end of said last named pin, and centralizing guides projecting beyond the outer surface of said head portion at opposite sides of one of said sizing pins.

4. A device as claimed in claim 3 in which said centralizing guides are provided with resilient outer contact tips.

References Cited in the file of this patent
UNITED STATES PATENTS

| | | |
|---|---|---|
| 1,625,766 | Simpson | Apr. 19, 1927 |
| 1,740,695 | Johansson | Dec. 24, 1929 |
| 2,095,405 | Aldeborgh et al. | Oct. 12, 1937 |
| 2,720,033 | Eisele | Oct. 11, 1955 |

FOREIGN PATENTS

| | | |
|---|---|---|
| 313,123 | Germany | June 27, 1919 |
| 211,133 | Switzerland | Nov. 1, 1940 |